United States Patent [19]
Jutras

[11] Patent Number: 5,886,508
[45] Date of Patent: Mar. 23, 1999

[54] MULTIPLE OUTPUT VOLTAGES FROM A CASCADED BUCK CONVERTER TOPOLOGY

[75] Inventor: Mark A. Jutras, Upton, Mass.

[73] Assignee: Computer Products, Inc., Fremont, Calif.

[21] Appl. No.: 920,678

[22] Filed: Aug. 29, 1997

[51] Int. Cl.$^6$ .................................................. G05F 1/577
[52] U.S. Cl. .......................... 323/267; 323/282; 363/21
[58] Field of Search .................................. 323/222, 267, 323/271, 282; 363/20, 21

[56] References Cited

U.S. PATENT DOCUMENTS

| | | | |
|---|---|---|---|
| 5,119,013 | 6/1992 | Sabroff | 323/267 |
| 5,122,728 | 6/1992 | Ashley | 323/282 |
| 5,155,430 | 10/1992 | Gulczynski | 323/267 |
| 5,336,985 | 8/1994 | McKenzie | 323/282 |
| 5,400,239 | 3/1995 | Caine | 363/21 |
| 5,412,308 | 5/1995 | Brown | 323/222 |
| 5,455,501 | 10/1995 | Massie | 323/267 |

OTHER PUBLICATIONS

"Secondary Side Post Regulator for AC/DC and DC/DC Multiple Output Converters", CS–5101 Data Sheet, Cherry Semiconductor Corporation, pp. 1–7, (Dec. 1996).

*Primary Examiner*—Jeffrey Sterrett
*Attorney, Agent, or Firm*—Skjerven, Morrill MacPherson, Franklin & Friel LLP; Michael J. Halbert

[57] ABSTRACT

A buck converter in accordance with the present invention provides multiple, well regulated, low voltage outputs. A cascaded buck converter comprises a main buck converter that is coupled to a subordinate buck converter through a cascade transistor in series with the free wheeling diode or transistor. The main buck converter is coupled to the free wheeling diode through the cascade transistor. Additional voltage outputs are possible by placing additional subordinate buck converters in series with the cascade transistor.

An isolated forward converter with multiple output voltages in accordance with the present invention may be derived using the cascaded buck converter topology. The cascading configuration permits multiple voltage outputs using a minimum number of switching devices while avoiding undesirable cross regulation.

14 Claims, 8 Drawing Sheets

MULTIPLE OUTPUT VOLTAGES FROM A CASCADED BUCK CONVERTER TOPOLOGY

FIELD OF THE INVENTION

The present invention relates to switch mode voltage regulators, particularly to buck converters and isolated forward converters that produce well regulated low output voltages.

BACKGROUND

Many modern electronic systems require more than one operating voltage. New generation integrated circuits, for example, call for multiple power supply voltages that are under 5 volts direct current (DC). Devices such as logic gates or microprocessors commonly require voltage sources of 5 V/3V3, 3V3/2V9, or 3V3/1V5. Thus, there is a demand for power conversion products capable of providing multiple, well regulated, low output voltages in a low cost package.

Figure 1:
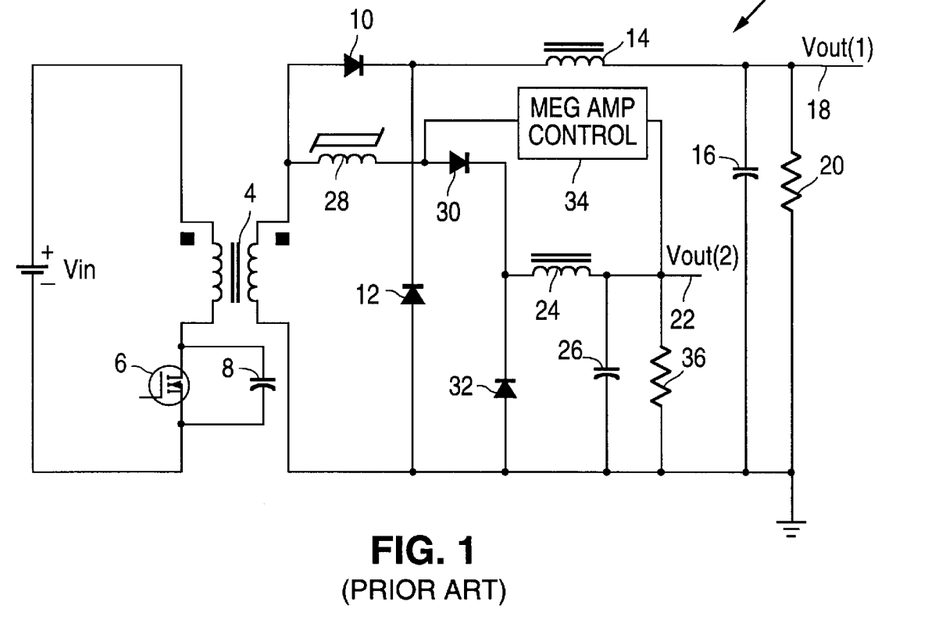
FIG. 1 is a circuit diagram of a dual output isolated forward converter using a magnetic amplifier.

An example of a forward converter that produces multiple output voltages may be seen in FIG. 1. FIG. 1 is a circuit diagram of an isolated forward converter 2 with dual output voltages $V_{out(1)}$ and $V_{out(2)}$. Converter 2 includes a conventional isolated forward converter, which produces $V_{out(1)}$ across load resistor 20, and an additional voltage output source, which produces $V_{out(2)}$ across load resistor 36. The conventional isolated forward converter of converter 2 includes a transformer 4, a transistor 6 and capacitor 8, a diode 10, a free wheeling diode 12, an inductor 14, a capacitor 16, and a control circuit (not shown). Control of a conventional isolated forward converter is well known in the art. An explanation of the operation of the conventional isolated forward converter of converter 2 is therefore omitted for brevity.

To generate output voltage $V_{out(2)}$, converter 2 has a second inductor 24 and second capacitor 26 connected to transformer 4 via a magnetic amplifier 28, and a diode 30. A second free wheeling diode 32 is also connected between second inductor 24 and ground potential. Thus, inductor 24 is connected to ground potential via a separate free wheeling path than used by inductor 14. A magnetic amplifier control circuit 34 causes magnetic amplifier 28 to block and unblock the flow of current from transformer 4 into second inductor 24.

Converter 2 suffers power losses because of the wire gauge and number of turns in magnetic amplifier 28. Because magnetic amplifier 28 is driven into saturation each cycle, magnetic core losses can be high. These losses are worsened at high switching frequencies used to achieve high packaging densities in DC to DC converters. Additionally, converter 2 can be expensive due to the cost of magnetic amplifier 28 and the number of switching devices required for operation of converter 2, i.e., diodes 10, 12, 30, and 32.

Figure 2:
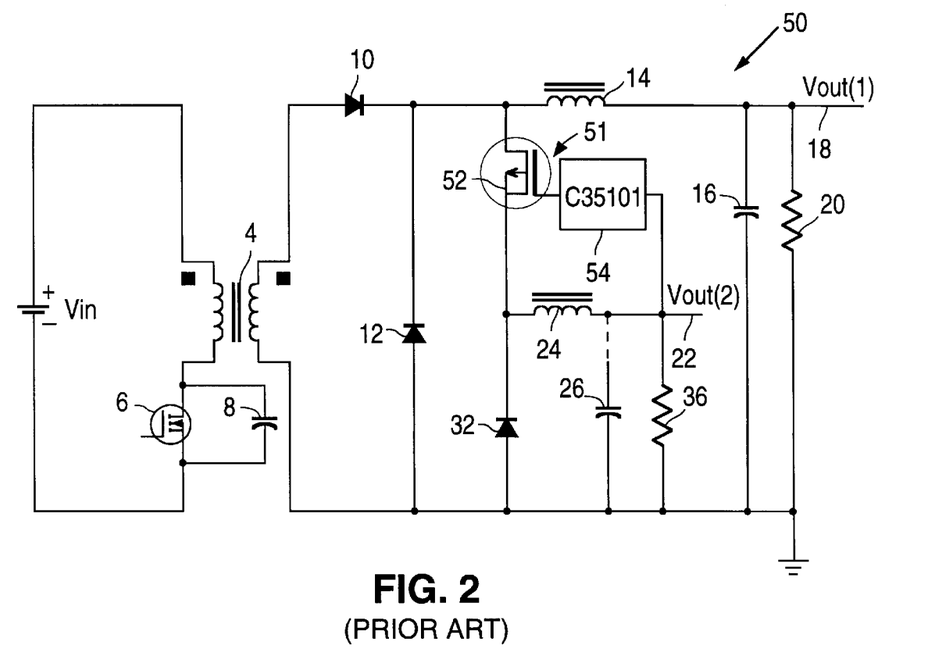
FIG. 2 is a-circuit diagram of a dual output isolated forward converter using an electronic magnetic amplifier.

FIG. 2 is a circuit diagram of another isolated forward converter 50 having dual output voltages. Converter 50 is similar to converter 2, like-numbered elements being the same. However, in converter 50 inductor 24 is connected, via a transistor 52, to a node between diode 10 and inductor 14. Converter 50 uses an electronic magnetic amplifier 51, which includes transistor 52 controlled by a control circuit 54. For example, control circuit 54 may be model number CS5101 manufactured by Cherry Semiconductor, Inc. As with converter 2, converter 50 has separate free wheeling paths for inductors 14 and 24, i.e., via free wheeling diodes 12 and 32, respectively. However, unlike converter 2, in converter 50 current flows from transformer 4 to both inductor 14 and inductor 24 via diode 10.

Circuit 50 requires a complicated bias voltage and gate drive voltage implementation for transistor 52. Further, there are potential cross regulation problems because transistor 52 is off when diode 10 is back biased. During the free wheeling period, there is no communication between inductor 14 and inductor 24. Thus, where $V_{out(2)}$ is loaded and $V_{out(1)}$ is not, converter 50 will be underpowered due to the lack of a path for current to flow between $V_{out(1)}$ to $V_{out(2)}$. Consequently, a load must be maintained on $V_{out(1)}$. Converter 50 is also expensive because of the number of switching devices, i.e., diodes 10, 12, 32, and transistor 52, and because of the expense associated with electronic magnetic amplifier 54.

SUMMARY

A buck (step-down) converter in accordance with one embodiment of the present invention provides multiple, well regulated, low voltage outputs. A cascaded buck converter comprises a main buck converter and a subordinate buck converter coupled by a cascade transistor, which is in series with a free wheeling switching device, such as a diode or a synchronous transistor. The cascade transistor remains on while the main buck converter is in its free wheeling period, permitting communication between the main buck converter and the subordinate buck converter during the free wheeling period. The subordinate buck converter can remain in its free wheeling period slightly longer than the main buck converter by turning off the cascade transistor while the main buck converter begins to recharge. Consequently, the subordinate buck converter can produce an output voltage that is slightly less than the voltage produced by the subordinate buck converter. An embodiment with additional output terminals is possible by placing additional subordinate buck converters in series with the free wheeling diode.

A isolated forward converter with multiple output voltages in accordance with another embodiment of the present invention may be derived using the cascaded buck converter topology. The cascading configuration permits multiple voltage outputs from one transformer using a minimum of switching devices while avoiding cross regulation difficulties.

DETAILED DESCRIPTION

Cascaded Buck Converter

Figure 3A:
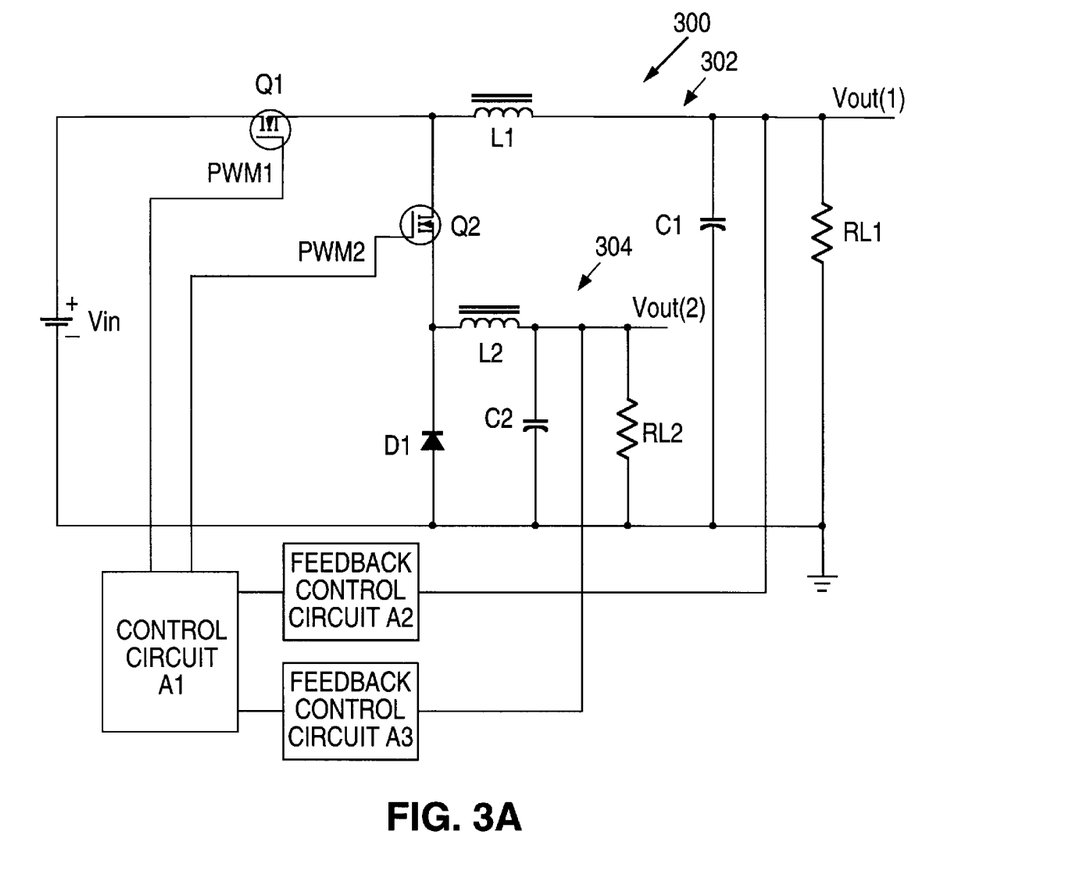
FIG. 3A is a circuit diagram of a cascaded buck converter with dual output voltages in accordance with the present invention.

FIG. 3A is a circuit diagram of a cascaded buck converter 300, which converts an input voltage $V_{in}$ to dual output voltages $V_{out(1)}$, $V_{out(2)}$.

Cascaded buck converter 300 includes a main buck converter 302, which provides output voltage $V_{out(1)}$ across load resistance RL1, and a subordinate buck converter 304, which provides output voltage $V_{out(2)}$ across a second load resistance RL2. Main buck converter 302 includes an inductive element, such as inductor L1, and a capacitive element, such as capacitor C1. A transistor Q1 is disposed between the input voltage $V_{in}$ and inductor L1. Transistor Q1 may be a switching device such as an N channel metal-oxide-semiconductor field-effect transistor ("MOSFET"). Other types of switching devices are also possible, such as bipolar transistor, or insulated gate bipolar transistor (IGBT). It is understood that other types of loads, such as inductive loads, or semiconductor circuits such as logic gates, gate arrays, ASICS, and microprocessors may be used in conjunction with the present invention, and that resistive loads are shown by way of example and not limitation.

Figure 9A:
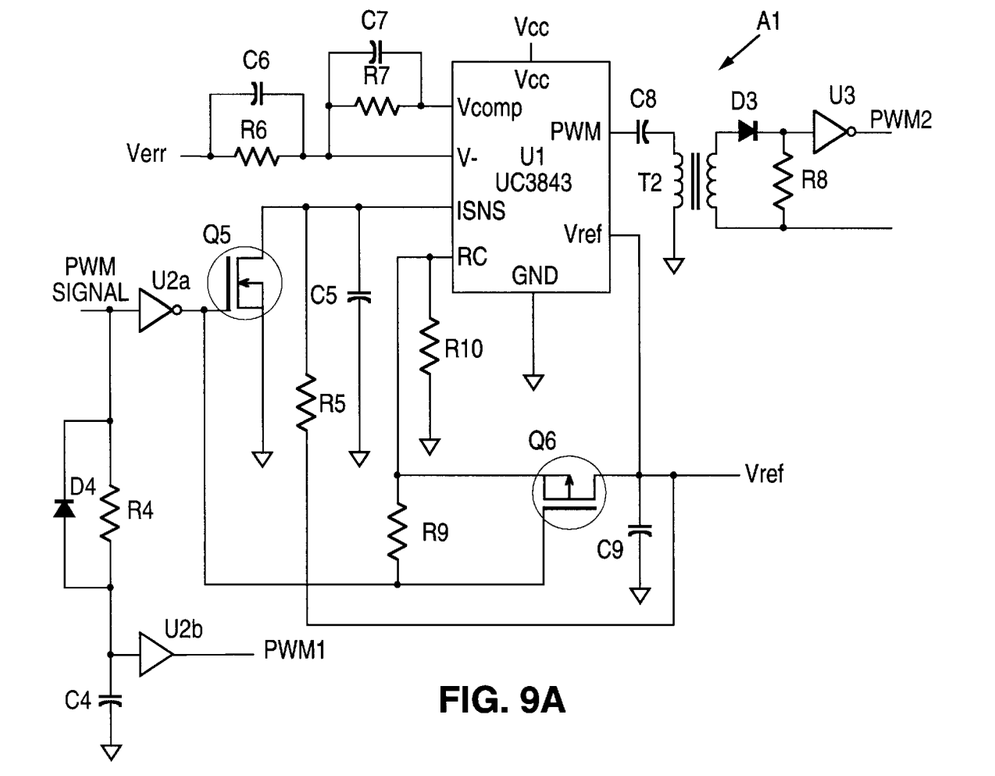
FIG. 9A is a circuit diagram of a control circuit implementation to be used in conjunction with the cascade buck converter topology in accordance with the present invention.
Figure 10A:
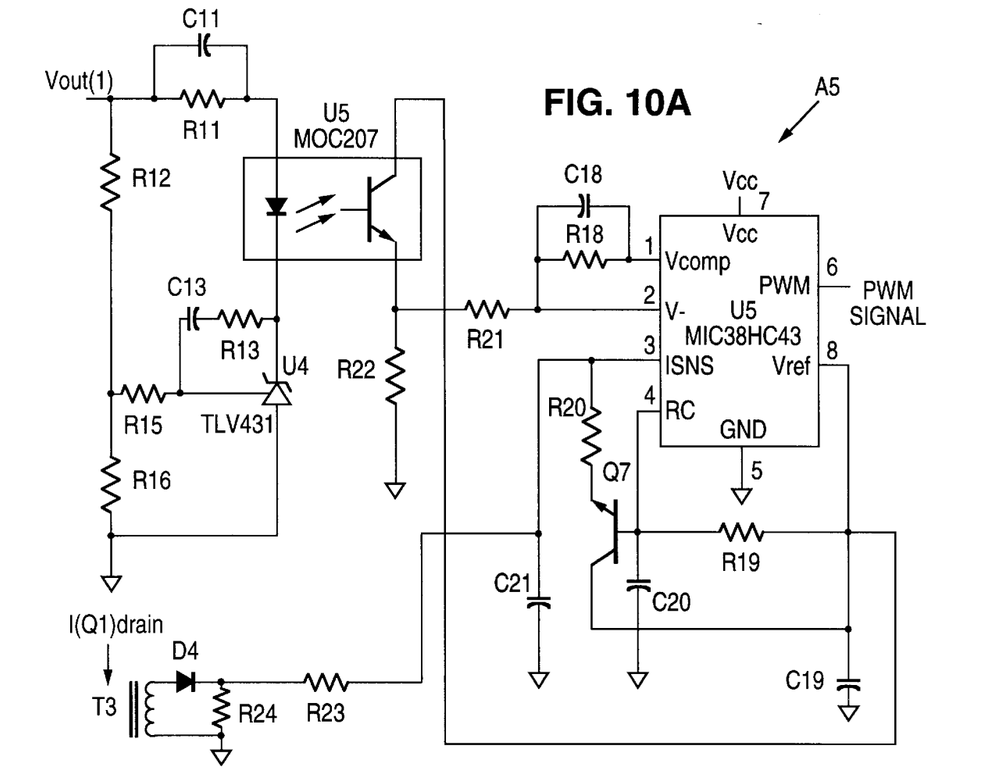
FIG. 10A is a circuit diagram of an isolated feedback control circuit to interface between the main buck converter topology and the control circuit shown in FIG. 9A.
Figure 10B:
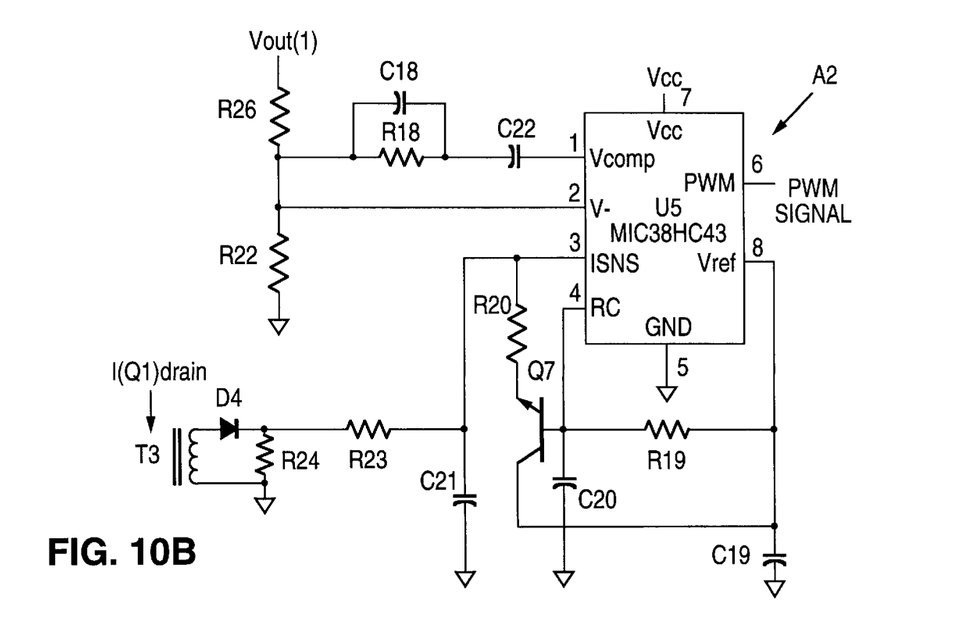
FIG. 10B is a circuit diagram of a non-isolated feedback control circuit to interface between the main buck converter topology and the control circuit shown in FIG. 9A.

A conventional feedback control circuit A2 receives feedback from $V_{out(1)}$ and provides a control signal for control circuit A1 to regulate transistor Q1. A non-isolated feedback control circuit described with reference to FIG. 10B is adequate to serve as feedback control circuit A2. Using a feedback control circuit to generate a control signal to regulate transistor Q1 is well within the skill of those in the art. A control circuit described with reference to FIG. 9A is adequate to serve as control circuit A1.

A cascade transistor Q2 is connected between a free wheeling current control device, such as diode D1, and a node between transistor Q1 and inductor L1. Cascade transistor Q2 may be an N channel MOSFET, for example, or any other appropriate switching device. Free wheeling diode D1 is connected between transistor Q1 and a common node, such as ground potential. The path defined by cascade transistor Q2 and diode D1 is the free wheeling path for inductor L1.

Figure 11:
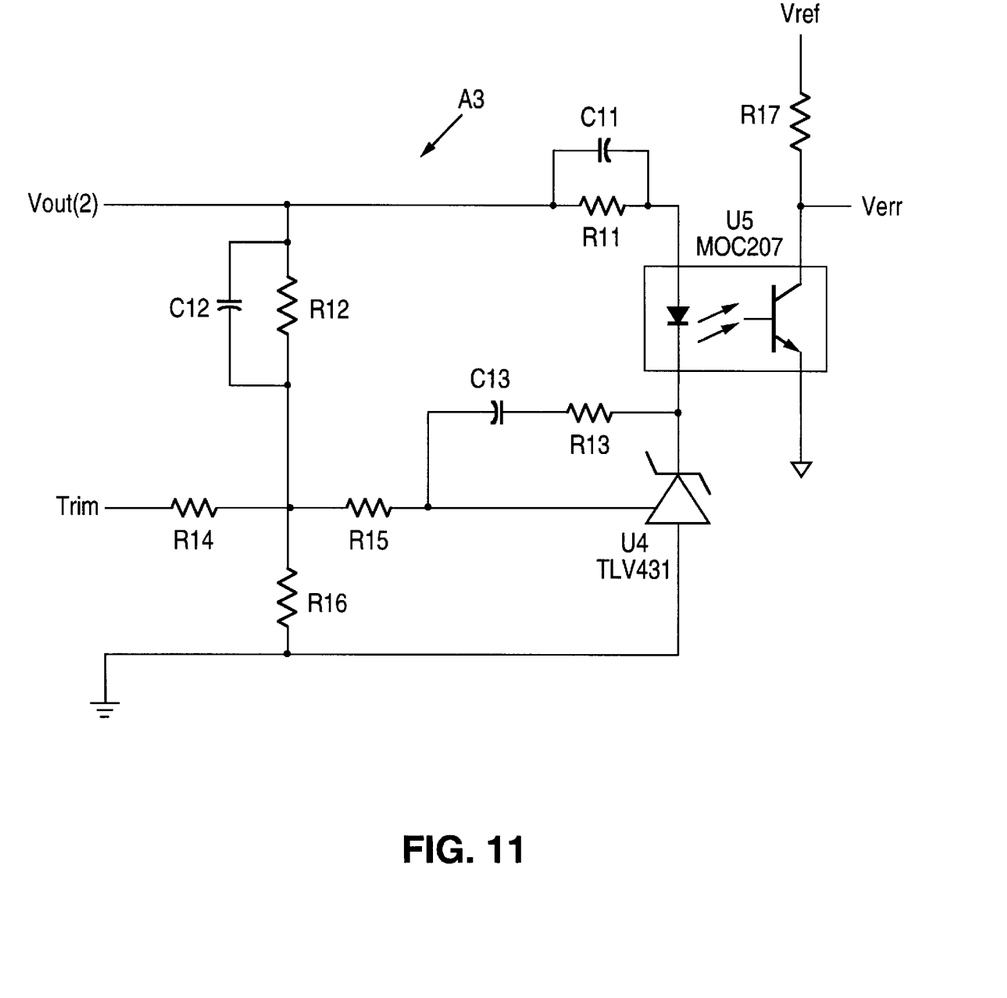
FIG. 11 is a circuit diagram of a feedback control circuit to interface between the subordinate buck converter topology and the control circuit shown in FIG. 9A.

Subordinate buck converter 304 includes an inductive element, such as inductor L2, which has one terminal connected to a node between cascade transistor Q2 and free wheeling diode D1. The other terminal of inductor L2 is connected to a capacitive element, such as capacitor C2. The on/off times of cascade transistor Q2 are controlled by control circuit A1 which receives a control signal from feedback control circuit A3. Control circuit A3 uses feedback from $V_{out(2)}$ to generate the control signal. The control circuit described with reference to FIG. 11 is adequate to serve as feedback control circuit A3.

Figure 3B:
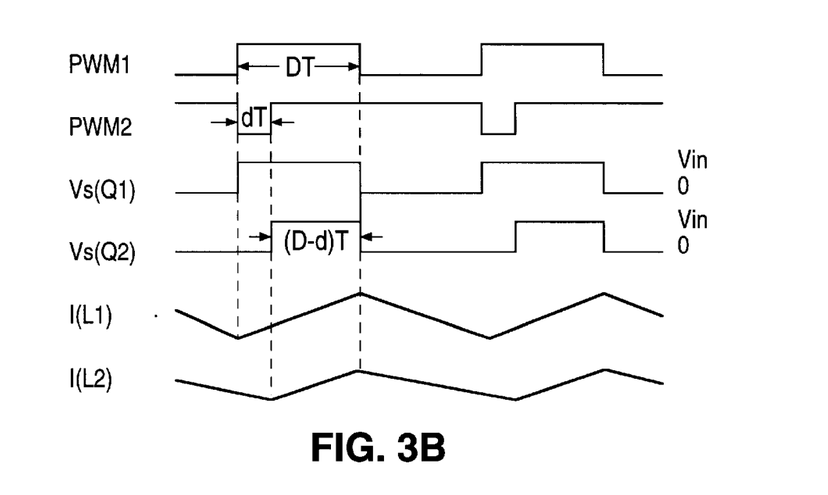
FIG. 3B is a waveform diagram illustrating operation of the cascaded buck converter with dual output voltages of FIG. 3A.

FIG. 3B illustrates the operation of cascaded buck converter 300 by depicting waveforms associated with like-named terminals of converter 300. Transistor Q1 is controlled using standard pulse width modulation (PWM) techniques to regulate output voltage $V_{out(1)}$. Feedback control circuit A2 pulse width modulates the on/off times of transistor Q1 at a constant frequency, or may frequency rate modulate transistor Q1 at constant on or off times to achieve the desired output voltage $V_{out(1)}$. Using feedback to control transistor Q1 to regulate $V_{out(1)}$ is well within the skill of those in the art.

Waveforms PWM1 and PWM2 illustrate the on/off times of respective transistors Q1 and Q2. As shown in FIG. 3B, while transistor Q1 is off, cascade transistor Q2 is on. Thus, when transistor Q1 is off, the free wheeling path for inductor L1 is established through free wheeling diode D1 and cascade transistor Q2. While transistor Q1 is off, free wheeling diode D1 is forward biased completing the circuits for both main buck converter 302 and subordinate buck converter 304. Consequently, while transistor Q1 is off, the currents in inductors L1 and L2 decrease, as illustrated in respective waveforms I(L1) and I(L2).

While transistor Q1 is on, the current flowing through L1 is increased, as illustrated by waveform I(L1). The duty cycle of transistor Q1 is denoted as the symbol D in waveform PWM1, where the symbol T denotes the period of waveform PWM1. Ignoring higher order effects, the output voltage produced by main buck converter 302 is:

$$V_{out(1)} = D*V_{in} \qquad \text{equ. 1}$$

where $V_{out(1)}$ is less than $V_{in}$.

Cascade transistor Q2 is also used to regulate the output voltage $V_{out(2)}$. Cascade transistor Q2 is turned off for a period of time d*T immediately after turning transistor Q1 on, as illustrated in waveform PWM2. Free wheeling diode D1 remains forward biased during this time, thus, completing the circuit for subordinate buck converter 304. This results in a continual decrease in the inductor L2 current, as illustrated in waveform I(L2).

For a period of time (D–d)*T, both transistor Q1 and cascade transistor Q2 are on. During this time, the current in inductor L2 increases, as illustrated in waveform I(L2). Again ignoring higher order effects, the output voltage of subordinate buck converter 304 is:

$$V_{out(2)} = (D-d)*V_{in} \qquad \text{equ. 2}$$

where $V_{out(2)}$ is less than $V_{in}$ and $V_{out(1)}$.

Figure 4A:
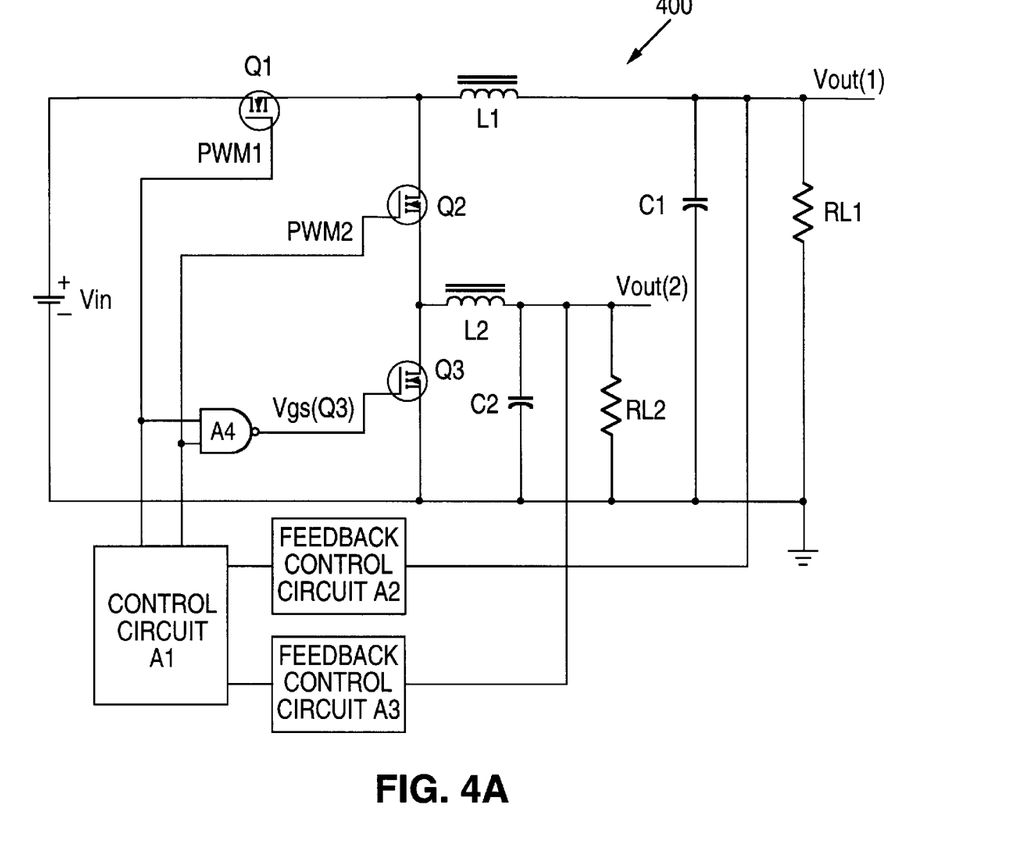
FIG. 4A is a circuit diagram of a cascaded buck converter with dual output voltages and fully synchronous transistors in accordance with the present invention.

It is understood that the circuit components in converter 300 may be replaced, reordered, or additional components may be added to the present invention to achieve the same or equivalent result. For instance, FIG. 4A is a circuit diagram of a fully synchronous cascaded buck converter 400 in accordance with an embodiment of the present invention. Converter 400 is similar to converter 300, like-designated elements being the same. However, converter 400 replaces free wheeling diode D1 with a synchronous transistor Q3, which may be an N channel MOSFET, for instance. Synchronous transistor Q3 is controlled with a control circuit A4 illustrated as a NAND logic gate. The particular illustrated logic gate of control circuit A4 represents the functionality of control circuit A4 and is not limiting. Many alternative means of accomplishing the function of control circuit A4 will be readily apparent to those of skill in the art.

Figure 4B:
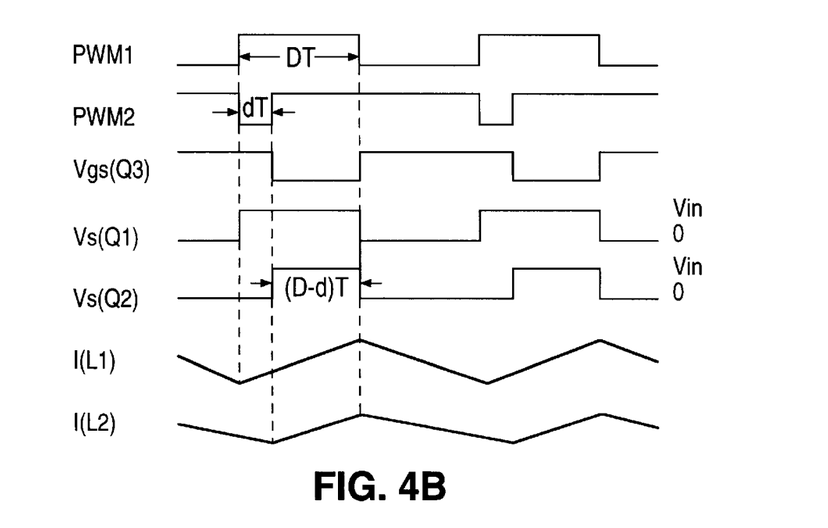
FIG. 4B is a waveform diagram illustrating operation of the cascaded buck converter with dual output voltages and fully synchronous transistor of FIG. 4A.

FIG. 4B is a waveform diagram illustrating the operation of fully synchronous cascaded buck converter 400, with the on/off times of synchronous transistor being illustrated by waveform Vgs(Q3). As can be seen in FIG. 4B, the operation of fully synchronous cascaded buck converter 400 is similar to the operation of converter 300 with synchronous transistor Q3 turning off only when transistor Q1 and cascade transistor Q2 are simultaneously conducting.

Figure 5:
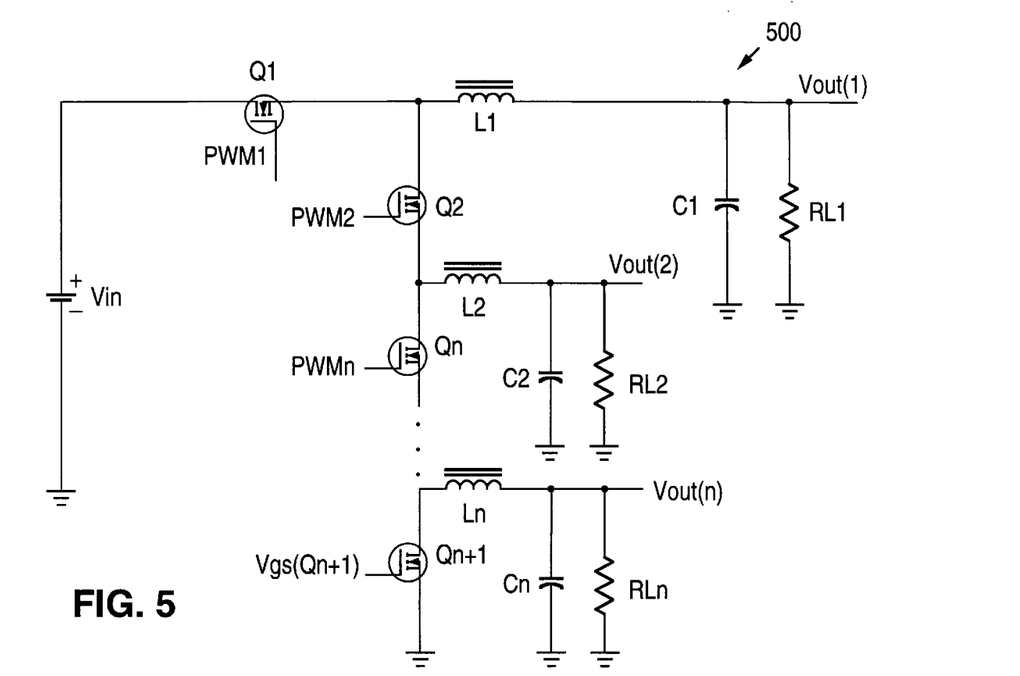
FIG. 5 is a circuit diagram of a cascaded buck converter with multiple output voltages in accordance with the present invention.

FIG. 5 is a circuit diagram of a multiple output cascaded buck converter 500 in accordance with another embodiment of the present invention. Converter 500 is similar to converter 400 with like-designated elements being the same. However, converter 500 has multiple output voltages $V_{out(1)}$ through $V_{out(n)}$ achieved by placing n additional subordinate buck converters and their associated cascade transistors in series in the free wheeling path. (The dots indicate that there could be any number of subordinate buck converters.) Each subsequent subordinate buck converter, with an inductor Ln, capacitor Cn, and cascade transistor Qn, is placed in series with the previous subordinate buck converter. In this manner, a total of n output voltages is possible. Converter 500, similar to converter 400, shows a synchronous transistor Qn+1 in place of a free wheeling diode. The control circuits regulating circuit 500, which are not shown for the sake of clarity, are connected in the manner described above in connection with FIGS. 3 through 5.

Converter 500 has a practical limit to the number of subordinate buck converters that are possible. When transistor Q1 is off and transistors Q2 through Qn+1 are open, the total current flowing through free wheeling transistor Qn+1 is the sum of the current flowing through all the output terminals. Because the additional current increases power losses in the free wheeling path, increasing the number of subordinate buck converters will increase the power loss. Consequently, there is a practical limit on the number of output terminals of converter 500 based on the power losses in the free wheeling path.

Isolated Forward Converter Using Cascaded Buck Converter Topology

Figure 6:
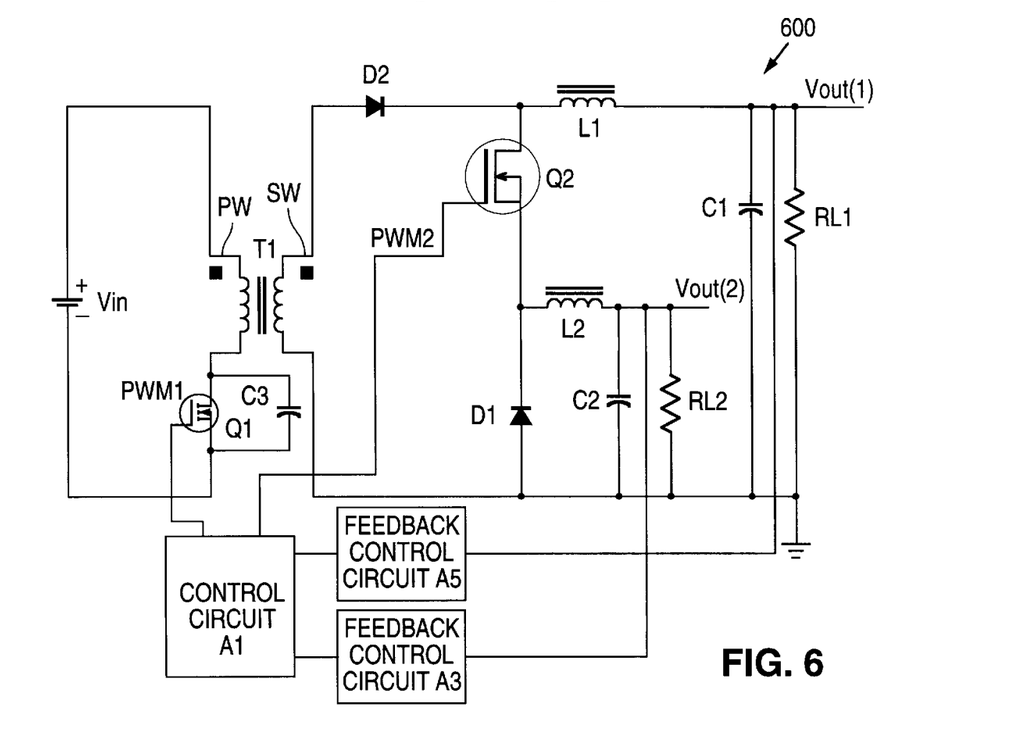
FIG. 6 is a circuit diagram of an isolated forward converter with dual output voltages using a cascaded buck converter topology in accordance with the present invention.

FIG. 6 is a circuit diagram of an isolated forward converter 600 with dual output voltages in accordance with the present invention. Isolated forward converter 600 uses the cascaded buck converter topology from FIG. 3A and operates in a similar manner, like-designated elements being the same. Isolated forward converter 600 employs a conventional transformer T1, with a primary winding PW and a secondary winding SW. Transistor Q1 is located on the primary winding side of transformer T1 and a diode D2 is disposed between the secondary winding of transformer T1 and a node coupling inductor L1 and cascade transistor Q2. A capacitor C3 is placed across transistor Q1 to act as a conventional resonant reset for transformer T1. However, any scheme to reset T1 could be used including clamp winding or an active clamp circuit. Transistor Q1 can also be located on the secondary winding side as will be understood by those skilled in the art.

As with converter 300 in FIG. 3A, transistor Q1 is controlled by control circuit A1. A conventional feedback control circuit A5 receives feedback from $V_{out(1)}$ and provides a control signal for control circuit A1 to regulate transistor Q1. An isolated feedback control circuit described with reference to FIG. 10A is adequate to serve as feedback control circuit A5.

When transistor Q1 is on, current builds up in primary winding PW storing energy in the magnetic field of transformer T1. The energy is forward transferred through secondary winding SW, through forward biased diode D2 and into inductor L1, causing the current in inductor L1 to increase. When cascade transistor Q2 is on, the energy is also transferred into inductor L2, causing the current in inductor L2 to increase. Free wheeling diode D1 is back biased while diode D2 is forward biased and cascade transistor Q2 is on.

When transistor Q1 is turned off, the polarities of primary winding PW and secondary winding SW reverse because of the collapsing magnetic field. This back biases diode D2. As in converter 300, when transistor Q1 is off cascade transistor Q2 remains on and free wheeling diode D1 is forward biased. The currents flowing through inductors L1 and L2 decrease during this time. When transistor Q1 is turned on again, cascade transistor Q2 turns off for a short period and diode D1 remains forward biased permitting the continual decrease in the current in inductor L2. During this period, diode D2 is forward biased and inductor L1 begins to charge again. After a short period cascade transistor Q2 turns on again and inductor L2 begins to charge.

Accordingly, using the cascaded buck converter topology from FIG. 3A, dual output voltages $V_{out(1)}$ and $V_{out(2)}$ can be derived from one transformer with a single secondary winding. Ignoring higher order effects, the output voltages $V_{out(1)}$ and $V_{out(2)}$ produced by isolated forward converter 600 are:

$$V_{out(1)} \approx D * \frac{N_s}{N_p} * V_{in} \qquad \text{equ. 3}$$

$$V_{out(2)} \approx (D-d) * \frac{N_s}{N_p} * V_{in} \qquad \text{equ. 4}$$

where $N_p$ is the number of windings of primary winding PW and $N_s$ is the number of windings of secondary winding SW. This topology requires only three transistors, i.e., cascade transistor Q2, free wheeling diode D1, and diode D2, and is therefore less expensive than magnetic amplifier isolated forward converter 2 or electronic magnetic amplifier isolated forward converter 50. Further, the design avoids cross regulation complications because $V_{out(1)}$ and $V_{out(2)}$ are in communication through one free wheeling path.

Figure 7:
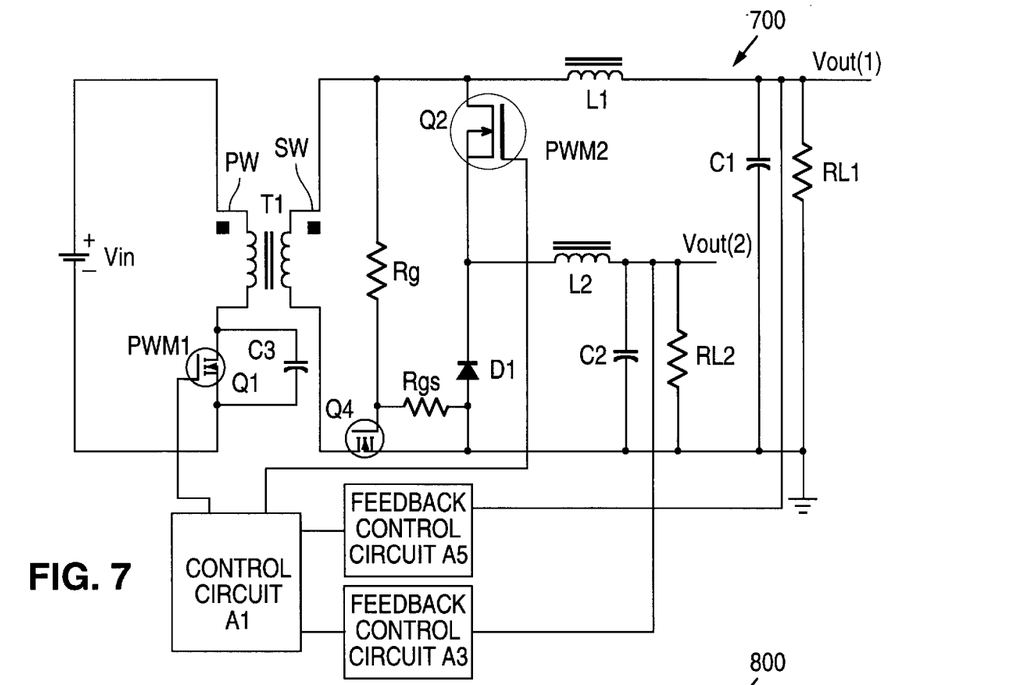
FIG. 7 is a circuit diagram of an isolated forward converter with dual output voltages and a synchronous forward transistor using a cascaded buck converter topology in accordance with the present invention.

As in the cascaded buck converter 300 of FIG. 3A, it is understood that circuit components may be replaced, reordered, or additional components may be added to the present isolated forward converter 600 to achieve the same or equivalent result. For example, FIG. 7 is a circuit diagram of an isolated forward converter 700 with a synchronous forward transistor Q4, which may be an N channel MOSFET or any other appropriate switching device. Transformer T1 supplies the gate voltage for forward transistor Q4 through resistors Rg and Rgs. Thus, forward transistor Q4 is synchronous with the change of polarity in transformer T1.

Figure 8:
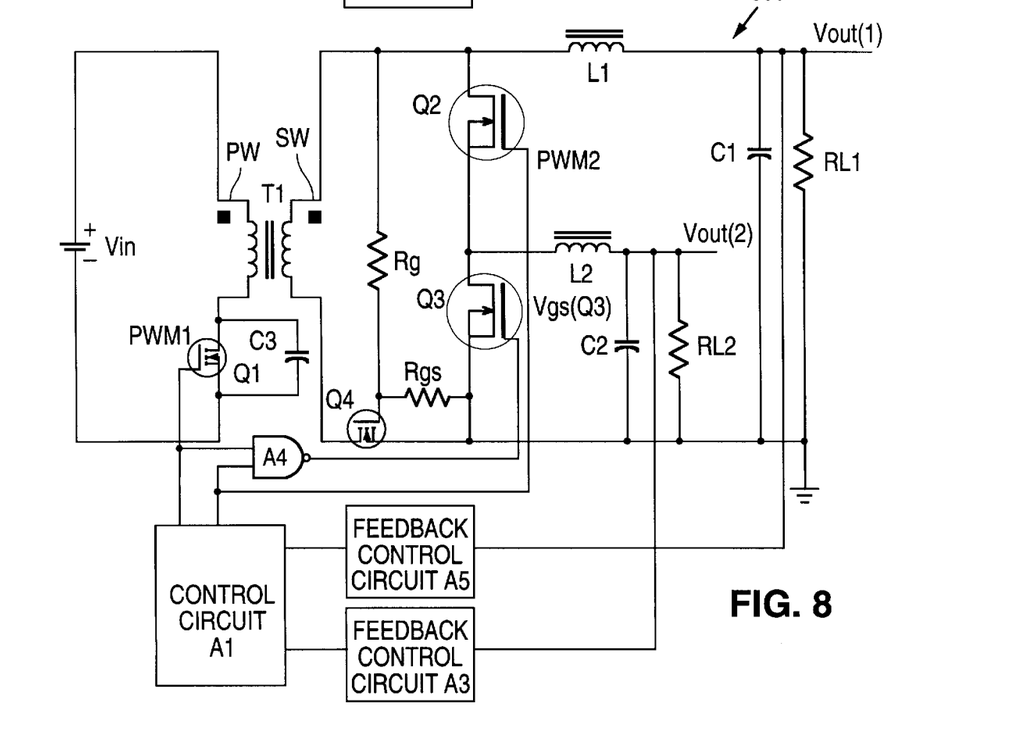
FIG. 8 is a circuit diagram of an isolated forward converter with dual output voltages and fully synchronous transistors using a cascaded buck converter topology in accordance with the present invention.

FIG. 8 shows a circuit diagram of a fully synchronous transformer isolated forward converter 800. Converter 800 is similar to converter 700 with the free wheeling diode D1 replaced by a free wheeling transistor Q3, similar to circuit 400 shown in FIG. 4A.

Control Circuits

FIG. 9A is a circuit diagram of a control circuit A1 that may be used to control the cascaded buck converter 300 or the isolated forward converter 600 of the present invention. It is understood that alternative control circuits are available, and the present invention is not limited to the use of control circuit A1. Control circuit A1 is derived using a standard eight pin current mode control integrated circuit U1, such as a UC3843 manufactured by Unitrode, Inc.

Isolated feedback control circuit A5, shown in FIG. 10A, receives feedback from $V_{out(1)}$ and, in response, conventionally generates a PWM signal using a pulse by pulse current mode control scheme. Feedback control circuit A5 receives output voltage $V_{out(1)}$ at the input terminal $V_{out(1)}$ and at the output terminal PWM SIGNAL produces a PWM signal, which is provided to control circuit A1 to control isolated forward converter 600, shown in FIG. 6. Feedback control circuit A5 uses an opto-isolated circuit U5, an adjustable Zener diode U4, and an integrated PWM circuit U5, such as model number MIC38HC43 manufactured by Micrel, Inc. It is understood that alternative control schemes may also be used to regulate $V_{out(1)}$, such as direct duty cycle control, voltage mode control, average current mode control, hysteretic current mode control, or any other control scheme. Using feedback to generate a PWM signal to regulate $V_{out(1)}$ is well within the skill of those in the art.

FIG. 10B depicts a non-isolated pulse by pulse current mode feedback control circuit A2, which may be used in conjunction with converter 300, shown in FIG. 3A. Feedback control circuit A2 is similar to feedback control circuit A5, with like designated elements being the same. However, feedback control circuit A2 is non-isolated, and therefore does not use an opto-isolated circuit U5. Feedback control circuit A2, similarly uses a pulse by pulse current mode control scheme. However, it is understood that alternative control schemes also may be used for feedback control circuit A2.

The PWM signals produced by either feedback control circuit A2 or A5 in FIGS. 10A, 10B are received by control circuit A1 at input terminal PWM SIGNAL. Control circuit A1 forwards the PWM signals to transistor Q1 which is connected to output terminal PWM1.

Figure 9B:
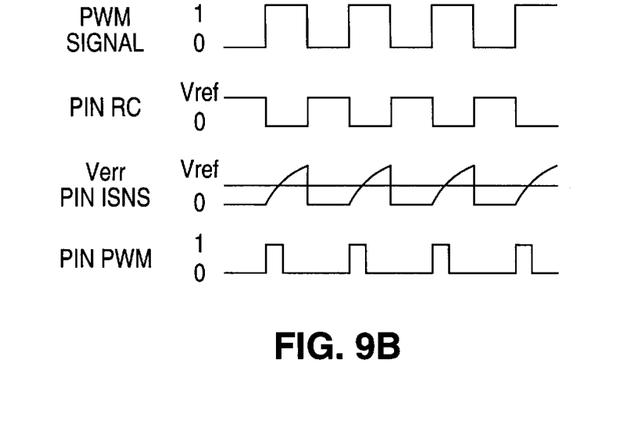
FIG. 9B illustrates the operation of the control circuit from FIG. 9A by depicting theoretical waveforms associated with like-named terminals of the control circuit.

Control circuit A1 also uses the PWM signals to generate a control pulse to regulate cascade transistor Q2 and to synchronize that control pulse with the PWM signals sent to transistor Q1. FIG. 9B illustrates the operation of control circuit A1 by depicting waveforms associated with like-named terminals of control circuit A1. The PWM signal from terminal PWM SIGNAL turns on and off transistors Q5 and Q6 after passing through an inverter U2a. A reference voltage Vref, from input terminal Vref, is applied across transistor Q6 and is received at pin RC on integrated circuit U1. Thus, pin RC receives a pulsed reference voltage as illustrated by waveform PIN RC in FIG. 9B.

Reference voltage Vref is also connected to pin ISNS through resistor R5 and capacitor C5. Transistor Q5 connects pin ISNS to ground potential. Accordingly, as transistor Q5 is turned on and off by the PWM signal an RC ramp signal is generated at pin ISNS, as illustrated by waveform PIN ISNS.

Control circuit A1 also receives at input terminal Verr an error voltage which is produced by feedback control circuit A3 and is derived from feedback from $V_{out(2)}$, as shown in FIG. 11. Integrated circuit U1 compares Verr to the signal at pin ISNS and produces at pin PWM a control pulse. A small pulse transformer T2 and an inverter U3 are coupled between pin PWM and output terminal PWM2, which is connected to the gate of cascade transistor Q2. The gate drive power for cascade transistor Q2 can be derived from a flyback winding on either output choke of transformer T2, as well as from an auxiliary winding on transformer T1 or from an independent power source.

FIG. 11 is a circuit diagram for feedback control circuit A3, which interfaces with control circuit A1. Feedback control circuit A3 receives output voltage $V_{out(2)}$ at the input terminal $V_{out(2)}$. Feedback control circuit A3 includes an opto-isolator U5, which uses an LED to illuminate a phototransistor. Feedback control circuit A3 receives a reference voltage at input terminal Vref. Using the feedback from terminal $V_{out(2)}$ to control opto-isolator U5, a voltage err signal is generated at output terminal Verr. The voltage err signal at terminal Verr is provided to control circuit A1 as described above. An input terminal TRIM may be used to manually change the regulated output voltage. Using an opto-isolator to produce a voltage err signal based on a feedback voltage would be well within the skill of those in the art.

Generally, control circuit A1 of FIG. 9A will have some propagation delays that result in the signal at PWM2 being phase shifted with respect to the PWM signal at input terminal PWM SIGNAL. It is desirable to compensate for this propagation delay to optimize performance of the system. Resistor R4, capacitor C4, and CMOS buffer U2b are used as a time delay circuit to produce a delayed digital waveform at output terminal PWM1. Thus, control circuit A1 may synchronize the signals generated at output terminals PWM1 and PWM2. Using a time delay circuit to produce a delayed digital waveform at output terminal PWM1 is well within the skill of those in the art.

Although specific embodiments have been described and illustrated to explain the present invention, the present invention is not limited thereto. Additional circuit components can be added to achieve additional functions including electromagnetic filtering. Some circuit components may be replaced with other components, for instance diodes may be used to replace the synchronous transistors. In addition, other switching devices, e.g., bipolar transistors or IGBTs may be used. Also, some components are shown directly connected to one another while others are shown connected via intermediate components. In each instance the method of interconnection establishes some desired electrical communication between two or more circuit nodes. Such communication may often be accomplished using a number of circuit configurations, as will be understood by those of skill in the art. Accordingly, various adaptations, modifications and combinations of the features of the specific embodiments can be practiced without departing from the scope of the invention as set forth in the following claims.

What is claimed is:

1. A circuit comprising:

an input voltage terminal;

a first transistor having an input lead coupled to said input voltage terminal, a control lead, and an output lead coupled to a first node, said first transistor switchable to connect said input lead and said output lead in an on state and disconnect said input lead and said output lead in an off state;

a first inductive element disposed between said first node and a first output terminal;

a second transistor having an input lead coupled to said first node, a control lead, and an output lead coupled to a second node, said first transistor switchable to connect said input lead and said output lead in an on state and disconnect said input lead and said output lead in an off state;

a second inductive element disposed between said second node and a second output terminal;

a first current control device coupled between said second node and a common node, wherein current between said common node and said first inductive element is conducted through said first current control device when said first transistor is in said off state and current between said common node and said second inductive element is conducted through said first current control device when said second transistor is in said off state; and a control circuit coupled to said control lead of said first transistor and to said control lead of said second transistor, wherein said control circuit turns said first and second transistors on and off.

2. Circuit of claim 1, further comprising:

a first capacitive element having a first lead and a second lead, said first lead coupled to said first output lead, said second lead coupled to said common node; and a second capacitive element having a first lead and a second lead, said first lead coupled to said second output lead, said second lead coupled to said circuit common.

3. Circuit of claim 1, wherein current between said common node and said second inductive element is conducted through said first current control device when said first transistor is in an off state.

4. Circuit of claim 1, wherein said first current control device is a diode.

5. Circuit of claim 1, wherein said first current control device is a third transistor having an input lead coupled to said second node, a control lead coupled to said control circuit, and an output lead coupled to said common node, said third transistor switchable to connect said input lead and said output lead in an on state and disconnect said input lead and said output lead in an off state, wherein said third transistor is in an off state only when said first transistor is in said on state and said second transistor is in said on state.

6. Circuit of claim 1, further comprising a transforming element disposed between said first transistor and said first node, said transforming element having a primary winding and a secondary winding.

7. Circuit of claim 6, further comprising a second current control device disposed between said transforming element and said first node, wherein said second current control device conducts current when said first transistor is in said on state.

8. Circuit of claim 7, wherein said second current control device is a diode disposed between said secondary winding and said first node.

9. Circuit of claim 6, further comprising a second current control device disposed between said secondary winding and said common node, wherein said second current control device conducts current when said first transistor is in said on state.

10. Circuit of claim 9, wherein said second current control device is a third transistor having an input lead coupled to said circuit common, a control lead coupled to said first node, and an output lead coupled to said transforming element, said third transistor switchable to connect said input lead and said output lead in an on state and disconnect said input lead and said output lead in an off state.

11. A method of producing DC voltages, said method comprising;

turning on a first transistor to couple a first inductive element to an input voltage;

turning off a second transistor to permit a current carrying device to couple a second inductive element to a common node;

turning on said second transistor while said first transistor is on to couple said second inductive element to said input voltage;

turning off said first transistor to permit said current carrying device to couple said first inductive element to said common node; and controlling said first and said second transistors to produce a first regulated DC voltage across a first load coupled to said first inductive element, and to produce a second regulated DC voltage across a second load coupled to said second inductive element.

12. Method of claim 11, further comprising turning on a third transistor when said first transistor or said second transistor is off to couple said first inductive element and said second inductive element to said common node.

13. A method of producing DC voltages, said method comprising:

turning on a first transistor to charge a first inductive element with an input voltage;

turning off a second transistor to discharge a second inductive element;

turning on said second transistor while said first transistor is on to charge said second inductive element with said input voltage;

turning off said first transistor while said second transistor remains on to discharge said first inductive element and said second inductive element; and controlling said first and said second transistors to produce a first regulated DC voltage across a first load coupled to said first inductive element, and to produce a second regulated DC voltage across a second load coupled to said second inductive element.

14. Method of claim 13, further comprising turning on a third transistor when said first transistor or said second transistor is off to discharge said first inductive element and said second inductive element, said third transistor is disposed between said second transistor and a common node.

* * * * *